(12) United States Patent
Alodhayb

(10) Patent No.: US 10,732,048 B1
(45) Date of Patent: Aug. 4, 2020

(54) MICROMECHANICAL PHOTOTHERMAL SPECTROSCOPY SYSTEM AND METHOD

(71) Applicant: KING SAUD UNIVERSITY, Riyadh (SA)

(72) Inventor: Abdullah Nasser Alodhayb, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/656,517

(22) Filed: Oct. 17, 2019

(51) Int. Cl.
| | | |
|---|---|---|
| *G01J 5/02* | (2006.01) | |
| *G01J 5/00* | (2006.01) | |
| *G01J 5/08* | (2006.01) | |
| *G01J 5/40* | (2006.01) | |

(52) U.S. Cl.
CPC ........... *G01J 5/0275* (2013.01); *G01J 5/0003* (2013.01); *G01J 5/0215* (2013.01); *G01J 5/0806* (2013.01); *G01J 5/40* (2013.01)

(58) Field of Classification Search
CPC ....... G01J 5/0275; G01J 5/0003; G01J 5/0215
See application file for complete search history.

(56) References Cited

U.S. PATENT DOCUMENTS

| | | | |
|---|---|---|---|
| 4,342,738 A | 8/1982 | Burgund | |
| 5,908,981 A | 6/1999 | Atalar et al. | |
| 5,977,544 A * | 11/1999 | Datskos | G01B 11/18 250/338.1 |
| 8,842,356 B2 | 9/2014 | Sandner et al. | |
| 9,846,115 B2 | 12/2017 | Urey et al. | |
| 2007/0287185 A1* | 12/2007 | Vafai | G01N 33/54373 436/63 |
| 2015/0285836 A1* | 10/2015 | Humphris | G01Q 10/045 850/1 |
| 2016/0138908 A1 | 5/2016 | Khan et al. | |
| 2018/0217041 A1 | 8/2018 | Urey et al. | |

OTHER PUBLICATIONS

Li et al., "Photothermal spectroscopy using multilayer cantilever for chemical detection," Applied Physics Letters, 76.9 Feb. 18, 2000, p. 1122-1124.

(Continued)

*Primary Examiner* — Hugh Maupin
(74) *Attorney, Agent, or Firm* — Richard C. Litman; Nath, Goldberg & Meyer

(57) ABSTRACT

The micromechanical photothermal spectroscopy system and method includes a cantilever assembly having at least one cantilever thermal sensor extending from a support. The sensors may be simple bimetallic sensors, or may include microchannels made from two materials having different thermal expansion coefficients for analysis of microfluids. A beam of infrared light is separated out from solar radiation by gratings and filters, and is at least partially projected on the cantilever sensor(s). Heat released from the analyte by absorbance of infrared light results in deflection of the cantilever sensor(s), which is measured by a deflection detector. A filter wheel permits tuning of the sunlight-based infrared light beam to plot a spectrum of absorbance as a function of wavelength or wave number characteristic of the analyte. The deflection detector may be optical (using a laser and position sensitive detector(s)), or may use piezo-resistive material embedded in the sensor(s).

18 Claims, 3 Drawing Sheets

(56) References Cited

OTHER PUBLICATIONS

Wig et al., "Photothermal spectroscopy of Bacillus anthracis and Bacillus cereus with microcantilevers," Sensors and Actuators B: Chemical, 114.1, Mar. 30, 2006, p. 206-211.
Bagheri et al., "Selective detection of physisorbed hydrocarbons using photothermal cantilever deflection spectroscopy," Sensors and Actuators B: Chemical, 191, Feb. 2014, p. 765-769.
Ghoraishi et al., "Clustering mechanism of ethanol-water mixtures investigated with photothermal microfluidic cantilever deflection spectroscopy," Scientific Reports, 6: 23966, Apr. 5, 2016.
Krause et al., "Trace explosive detection using photothermal deflection spectroscopy", J. Appl. Phys. (2008), vol. 103, p. 094906 (8 pages).
Kim et al., "Photothermal cantilever deflection spectroscopy", EPJ Techniques and Instrumentation (2014), vol. 1, 12 pages.
Etayash et al., "Microfluidic cantilever detects bacteria and measures their susceptibility to antibiotics in small confined volumes", Nature Communications (2016), vol. 7:12947, 9 pages.

\* cited by examiner

MICROMECHANICAL PHOTOTHERMAL SPECTROSCOPY SYSTEM AND METHOD

BACKGROUND

1. Field

The disclosure of the present patent application relates to spectroscopic devices and methods, and particularly to a micromechanical photothermal spectroscopy system and method that uses sunlight as an infrared light source

2. Description of the Related Art

Microcantilever sensors offer high sensitivity in the detection of adsorbed molecules, based either on resonance frequency shift or changes in cantilever deflection, as both of these signals can be detected with very high resolution. Despite the high sensitivity offered by such sensors, cantilevers suffer from poor selectivity due to the lack of sufficiently selective interfacial layers that can be immobilized on cantilever surfaces. This problem can be overcome by using photothermal cantilever deflection spectroscopy (PCDS), which exploits the high thermomechanical sensitivity of bi-material microcantilevers. A bi-material cantilever responds to heat generated by the non-radiative decay process when the adsorbed molecules are resonantly excited with infrared (IR) light. The variation in the cantilever deflection as a function of illuminating IR wavelength corresponds to the conventional IR absorption spectrum of the adsorbed molecules. In addition, the mass of the adsorbed molecules can be determined by measuring the resonance frequency shift of the cantilever as an orthogonal signal for the quantitative analysis.

FIGS. 2, 3A and 3B illustrate a conventional photothermal cantilever deflection spectroscopy system 100. The system 100 includes a microcantilever assembly 116, which has an elongated support 126 flexibly extending from a substrate 122. The elongated support 126 has opposed upper and lower surfaces. A microchannel 130 is mounted on the upper surface for receiving an analyte (via inlet 124). In FIG. 3B, the analyte is shown as a fluid carrying bacteria B, although it should be understood that PCDS systems may be used with a wide variety of different analytes, including non-biological samples.

The microchannel 130 is formed from a material (such as silicon nitride) that is at least partially transparent to infrared light and has a first thermal expansion coefficient associated therewith. A reflective material 128 (such as gold) is coated on the lower surface of the elongated support 126, and the reflective material 128 has a second thermal expansion coefficient associated therewith that is different from the first thermal expansion coefficient.

A beam of infrared light IR is projected onto the microchannel 130. Due to the differences of the thermal expansion coefficients, the infrared light IR impinging upon the microchannel 130 causes the microchannel 130 to expand at a different rate from the reflective material 128, thus causing a deflection of the at least one elongated support 126. The degree of deflection is measured, and the measured degree of deflection is indicative of the composition of the analyte contained within the microchannel 130.

In the example of FIG. 2, a conventional infrared monochromator 102 is used to generate the infrared light IR, which passes through an optical chopper 104. The infrared light IR is reflected by focusing and directional optics, such as a concave focusing mirror 112 and flat mirror 114, to focus the infrared light IR onto the microchannel 130 of microcantilever assembly 116. The deflection of the elongated support 126 is then measured optically. A laser 118 generates and projects a transmitted light beam TL onto the reflective material 128 of the elongated support 126. A position sensitive detector 120 receives a reflected light beam RL from the reflective material 128. The position of the reflected light beam RL received by the position sensitive detector 120 will vary, depending upon the degree of deflection of the elongated support 126, thus allowing for measurement of the degree of deflection based on the position of the received reflected light beam RL.

A lock-in amplifier 108 receives a deflection signal from the position sensitive detector 120, as well as receiving the reference frequency of the optical chopper 104. A spectrum analyzer 106 is in communication with the lock-in amplifier 108, and is used for plotting the degree of deflection as a function of wavelength to produce a spectrum associated with the composition of the analyte. The variation in the cantilever deflection as a function of illuminating IR wavelength corresponds to the conventional IR absorption spectrum of the analyte.

Although conventional systems, such as system 100, are relatively common for performing PCDS, as noted above, an infrared monochromator or the like is typically used as an IR source. Using such conventional IR sources provides very limited wavelength ranges for tuning, typically do not include the far-infrared band, and have relatively poor intensity. Further, such IR sources are typically bulky and expensive. Additionally, such laboratory sources of IR light typically require calibration, since the IR wavelength distribution often varies. As a result of this variation, the measured spectra will typically contain artifacts related to intensity variation, thus making it difficult to easily analyze the spectra associated with the analytes under study. Thus, a micromechanical photothermal spectroscopy system and method solving the aforementioned problems is desired.

SUMMARY

The micromechanical photothermal spectroscopy system and method includes at least one cantilever thermal sensor, and preferably a multicantilever array of sensors, extending from a support. The sensors may be simple bimetallic sensors, or may include microchannels made from two materials having different thermal expansion coefficients for analysis of microfluids. A beam of infrared light is separated out from solar radiation by gratings and filters, and is at least partially projected on the cantilever sensor(s). Absorption of infrared light by an analyte coated on the sensor(s) or contained in the microfluidic channel at a frequency resonant with vibrations of the molecules in the analyte followed by thermal decay or release of the heat causes proportional deflection of the sensors due to the different coefficients of thermal expansion, which is measured by a deflection detector, which may be reflection of a laser beam to a position sensitive detector and/or piezoresistor(s) embedded in the sensors. An oscilloscope, spectrum analyzer, and/or software may be used to plot deflection or absorbance as a function of frequency or wavenumber, producing a distinctive spectrum characteristic of the composition of the analyte similar to a conventional IR spectroscopic analysis, but from much smaller samples of analyte and at lower cost due to the sunlight-based light source.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
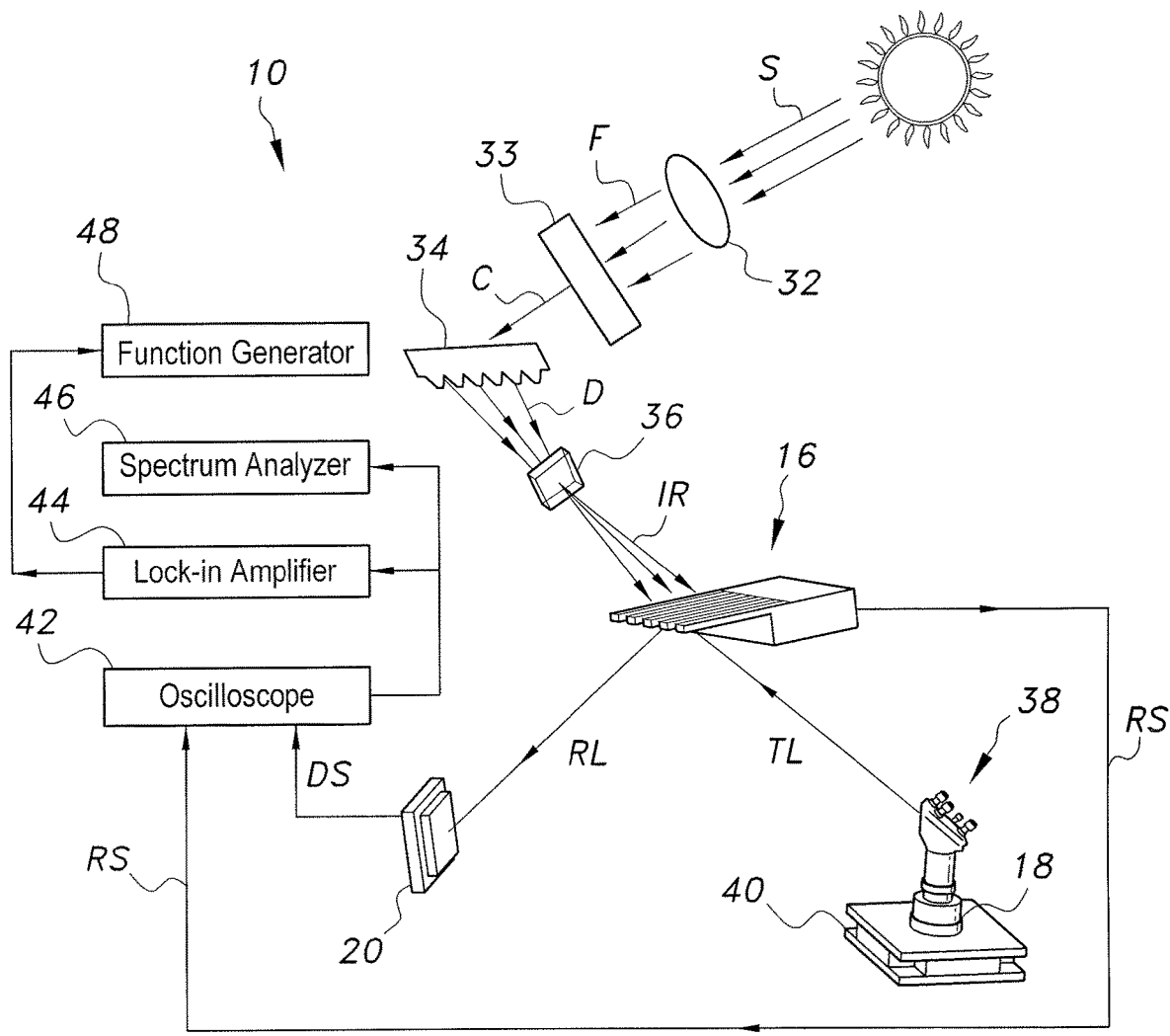
FIG. 1A is a schematic diagram of a micromechanical photothermal spectroscopy system.
Figure 1B:
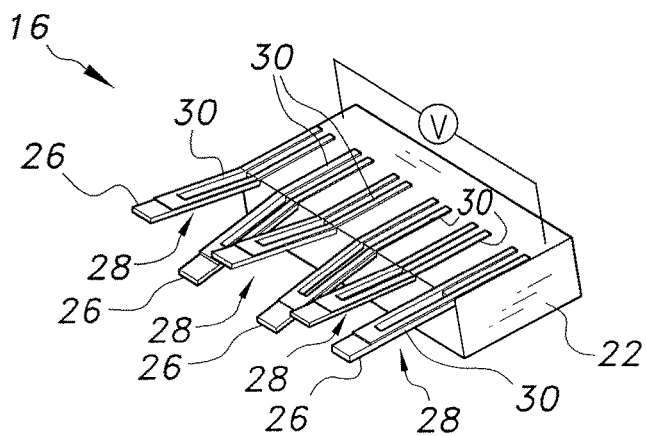
FIG. 1B is a detailed perspective view of a cantilever assembly of the micromechanical photothermal spectroscopy system of FIG. 1A.
Figure 2:
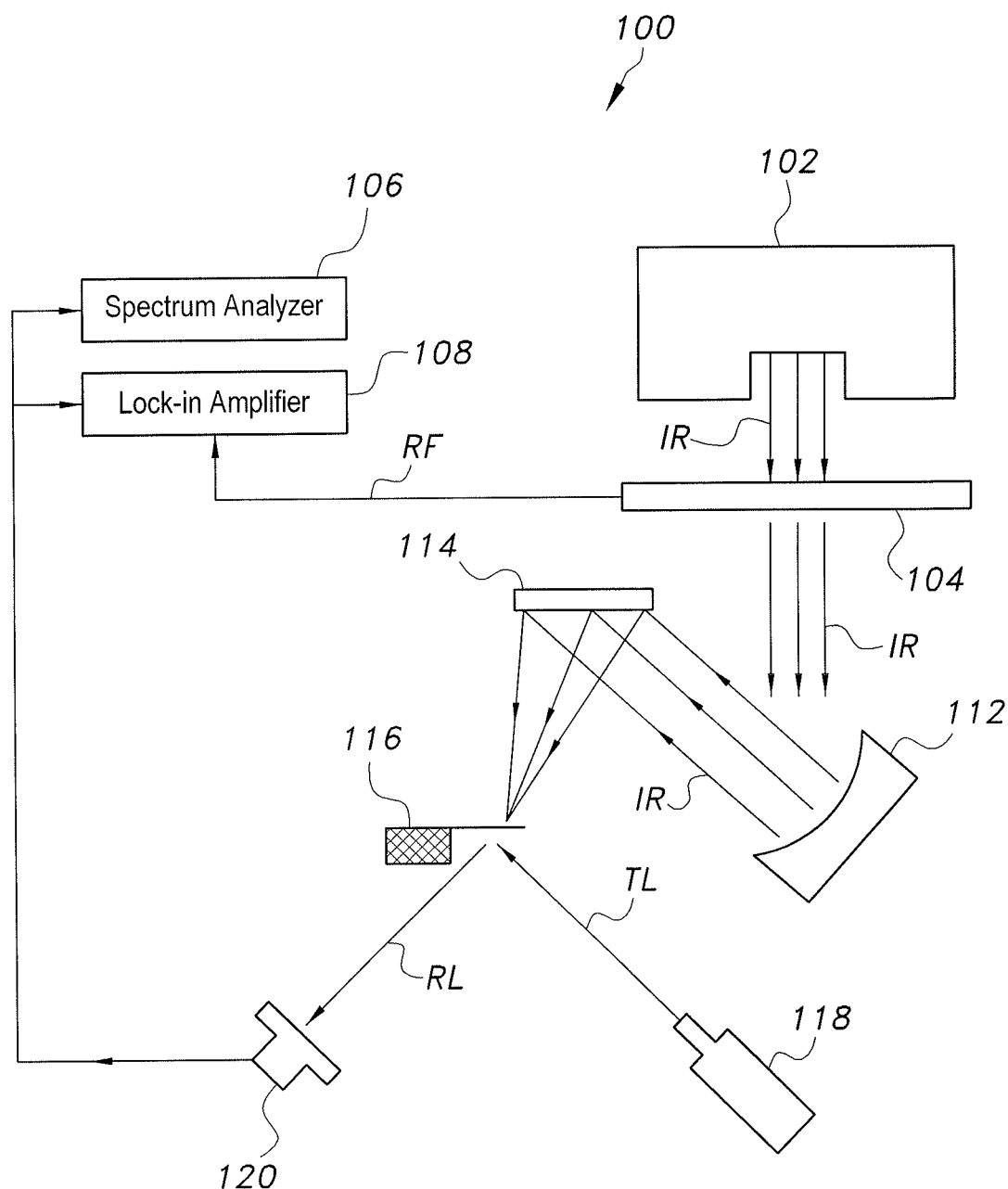
FIG. 2 diagrammatically illustrates a prior art system for performing photothermal cantilever deflection spectroscopy.
Figure 3A:
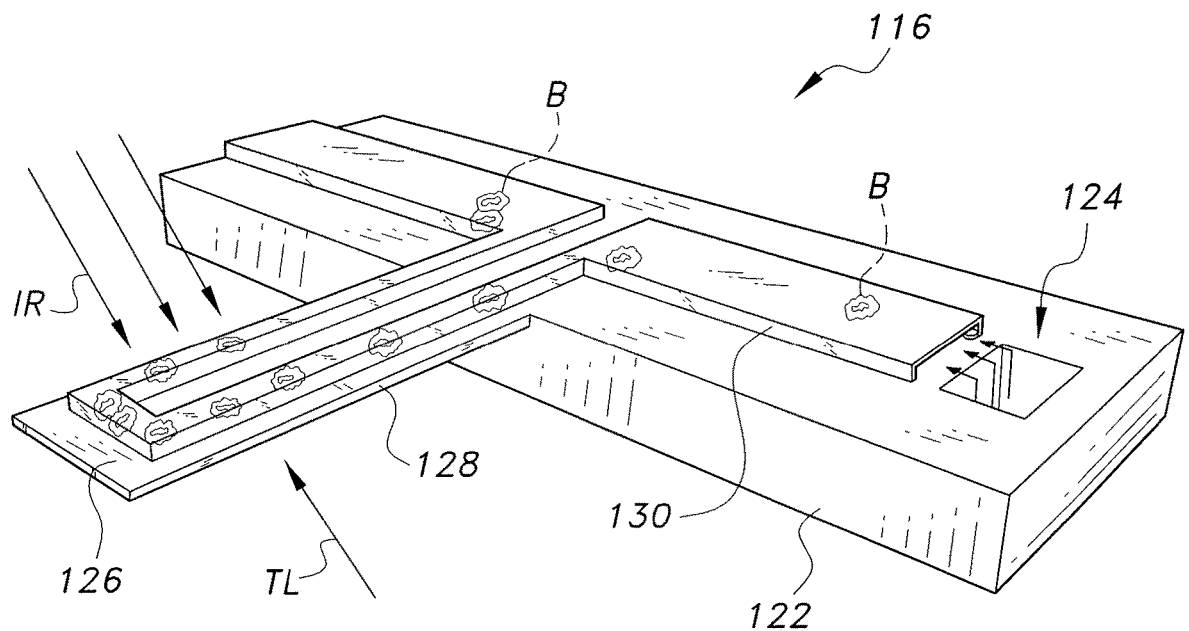
FIG. 3A is a perspective view of a cantilever assembly of the prior art system for performing photothermal cantilever deflection spectroscopy of FIG. 2.
Figure 3B:
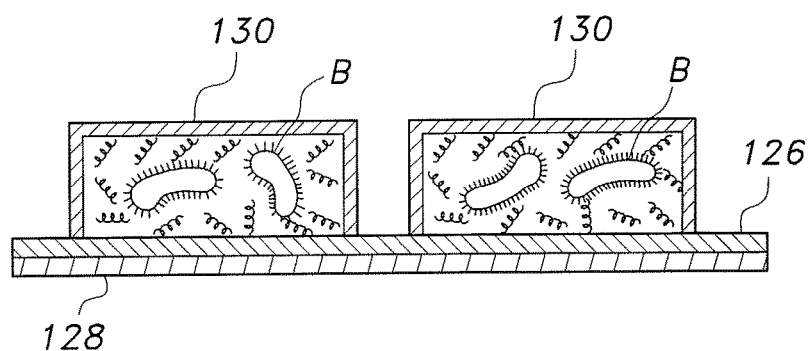
FIG. 3B is a partial front view in section of the prior art cantilever assembly of FIG. 3A.

As shown in FIGS. 1A and 1B, the micromechanical photothermal spectroscopy system 10 includes at least one cantilever thermal sensor. Preferably, the system 10 includes a plurality of cantilever thermal sensors, referred to as a microcantilever array or a cantilever thermal sensor assembly 16. The embodiments shown in FIGS. 1A and 1B have a plurality of cantilever sensors 26 extending from a substrate or support 22. In FIG. 1B, six such elongated sensors 26 are shown. However, it should be understood that the six elongated sensors 26 are shown for exemplary purposes only, and that any desired number of elongated sensors 26 may be extend from the support 22. The sensor 26 may be a simple cantilever made from two materials having different coefficients of thermal expansion, and may operate by adsorption of an analyte on one or both surfaces of the sensor, the analyte subsequently absorbing infrared light with consequent generation of heat that deflects the sensor. However, the exemplary embodiment shown in FIGS. 1A and 1B has a microchannel 30 mounted on the upper surface for receiving a fluid analyte (either gas or liquid). It should be understood that any suitable type of microchannel 30 may be used. For example, the microchannel 30 may be similar to the microchannel 130 of FIGS. 3A and 3B. It should be understood that the overall dimensions and configuration of the cantilever thermal sensor assembly 16 are shown in FIGS. 1A and 1B for exemplary and illustrative purposes only.

The microchannel 30 is formed from a material (e.g., silicon nitride) that is at least partially transparent to infrared light and has a first thermal expansion coefficient associated therewith. A reflective material 28 (e.g., gold or aluminum) is coated on the lower surface of the at least one elongated support 26, and the reflective material 28 has a second thermal expansion coefficient associated therewith which is different from the first thermal expansion coefficient. It should be understood that any suitable materials may be used in the manufacture of cantilever assembly 16, such as the non-limiting exemplary materials described above with respect to FIGS. 3A and 3B.

A beam of infrared light IR is separated out from solar radiation S and is projected, at least partially, onto the cantilever thermal sensor(s) 26 and is adsorbed by the analyte in the microchannel 30, with subsequent release of heat due to non-radiative decay of vibrational and rotational energy of the compound(s) in the analyte. Due to the differences of the thermal expansion coefficients, the infrared light IR incident on the cantilever sensor 26 causes the transparent material 30 to expand at a different rate from the reflective material 28, thus causing a deflection of the sensor 26. The degree of deflection is measured, and the measured degree of deflection is indicative of the composition of the analyte contained within the microchannel 30. In FIG. 1B, the exemplary multiple cantilever thermal sensors 26 are shown in different degrees of deflection. It should be understood that this arrangement is shown for illustrative purposes only, particularly to indicate the flexing of the elongated sensors 26 relative to the support 22, which allows for deflection to take place.

It should be understood that any suitable type of optics may be used to separate the infrared beam IR from the solar radiation S. In the example of FIG. 1A, a focusing lens 32 focuses the solar radiation S into a focused beam F. It should be understood that the focusing lens 32 may be any suitable type of focusing lens, such as a parabolic lens, or may be replaced by a focusing minor or the like. The focused beam F is collimated by a collimator 33, and collimated beam C is diffracted through a diffraction grating 34 to separate the collimated beam C into diffracted beams D having differing wavelengths. The diffracted beams D are passed through an infrared filter 36 to separate out the beam of infrared light IR. It should be understood that infrared filter 36 may be any suitable type of filter, such as a wavelength-selective slit or the like, or may be a filter wheel, providing for tunability of the infrared wavelength, which may be scanned to locate the frequency or frequencies at which absorption occurs.

The infrared beam IR, which is produced from solar radiation S (i.e., from sunlight), has a continuous infrared spectrum, covering a broad range (including the far-infrared band) with relatively high intensities. Additionally, since the wavelength distribution of infrared contained in sunlight is well known, and does not change with location, no calibration of the infrared source will be required.

The deflection of the at least one cantilever thermal sensor 26 may be measured optically. As shown in the exemplary embodiment of FIG. 1A, a laser diode 18 generates and projects a transmitted light beam TL onto the tip of the cantilever sensor 26. At least one position sensitive detector 20 receives a reflected light beam RL from the sensor 26. The position of the reflected light beam RL received by the at least one position sensitive detector 20 will vary, depending upon the degree of deflection of the at least one cantilever sensor 26, thus allowing for measurement of the degree of deflection based on the position of the received reflected light beam RL.

A lock-in amplifier 44, or the like, may be provided for receiving a deflection signal DS from the at least one position sensitive detector 20. An oscilloscope 42, or the like, is in electrical communication with the lock-in amplifier 44 for measuring the degree of deflection from the deflection signal DS. A spectrum analyzer 46 in communication with a function generator 48, or the like, may be used for plotting the degree of deflection as a function of wavelength to produce a spectrum associated with the composition of the analyte. The variation in the deflection as a function of illuminating infrared wavelength corresponds to the conventional infrared absorption spectrum of the analyte.

In addition to optically detecting the degree of deflection, the at least one cantilever thermal sensor 26 may be may have a piezo-resistive material embedded therein. As shown in FIG. 1B, a potential difference V may be applied, allowing for measurement of the resistence of the at least one cantiver sensor 26. The lock-in amplifier 44 may be in electrical communication with the at least one elongated support 26 for receiving a resistance signal RS representative of the measured resistance of the at least one elongated support 26. Changes of the measured resistance may then be further used to determine the degree of deflection, as in a strain gauge.

In FIG. 1A, the laser diode 18 is shown mounted on a conventional translation actuator 40 for selectively adjusting a position of the laser diode 18 with respect to the cantilever assembly 16. It should be understood that the position of laser diode 18 may be adjusted in any suitable manner, such as by a conventional X-Y translation table or the like. Additionally, in FIG. 1A, a conventional laser diode focusser 38 is shown for focusing the transmitted light beam TL onto the cantilever sensor 26. It should be understood that focusser 38 is shown for exemplary purposes only, and that any suitable type of focusing optics may be used.

It is to be understood that the micromechanical photothermal spectroscopy system and method are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A micromechanical photothermal spectroscopy system adapted to use solar radiation, comprising:
   a microcantilever thermal sensor assembly having at least one cantilever thermal sensor and a support, the at least one cantilever thermal sensor extending from the support, the at least one cantilever thermal sensor being made from a first material and a second material, the first and second materials having different coefficients of thermal expansion so that the at least one cantilever thermal sensor deflects when heat is applied to the sensor incident to absorption of infrared light by an analyte adsorbed on or disposed in the sensor, wherein the at least one cantilever thermal sensor defines a microfluidic channel configured for receiving the analyte in a fluid state, the channel having at least one wall transparent to infrared light;
   an optical grating and at least one optical filter configured for directly separating a beam of infrared light solely from solar radiation and at least one lens configured for projecting the beam of infrared light at least partially onto the microfluidic channel of the at least one cantilever thermal sensor; and
   a deflection detector for measuring deflection of the at least one cantilever thermal sensor.

2. The micromechanical photothermal spectroscopy system as recited in claim 1, wherein the at least one lens comprises a focusing lens for focusing the solar radiation into a focused beam.

3. The micromechanical photothermal spectroscopy system as recited in claim 2, further comprising a collimator for collimating the focused beam into a collimated beam.

4. The micromechanical photothermal spectroscopy system as recited in claim 3, wherein the optical grating comprises a diffraction grating for receiving the collimated beam and separating the collimated beam into diffracted beams having differing wavelengths.

5. The micromechanical photothermal spectroscopy system as recited in claim 4, wherein the at least one optical filter comprises a filter wheel having a plurality of optical filters for tuning the diffracted beams of infrared light to different wavelengths to scan at least a portion of the infrared spectrum for maximum absorbance of infrared light.

6. The micromechanical photothermal spectroscopy system as recited in claim 1, wherein the deflection detector comprises:
   a laser capable of generating and projecting a transmitted detector light beam onto the at least one cantilever thermal sensor; and
   a position sensitive detector configured for receiving a reflected detector light beam from the at least one cantilever thermal sensor and generating a deflection signal.

7. The micromechanical photothermal spectroscopy system as recited in claim 6, wherein the deflection detector further comprises a lock-in amplifier for receiving the deflection signal from the position sensitive detector.

8. The micromechanical photothermal spectroscopy system as recited in claim 7, wherein the deflection detector further comprises an oscilloscope in electrical communication with the lock-in amplifier configured for measuring the deflection of the at least one cantilever thermal sensor.

9. The micromechanical photothermal spectroscopy system as recited in claim 8, wherein the deflection detector further comprises a spectrum analyzer for plotting the degree of deflection as a function of wavelength to produce a spectrum.

10. The micromechanical photothermal spectroscopy system as recited in claim 9, wherein the at least one cantilever thermal sensor further comprises a piezo-resistive material embedded therein, the lock-in amplifier being in electrical communication with the at least piezo-resistive material for receiving a resistance signal proportional to deflection of the at least one cantilever thermal sensor.

11. The micromechanical photothermal spectroscopy system as recited in claim 1, wherein the at least one cantilever thermal sensor comprises a microcantilever array having a plurality of cantilever thermal sensors.

12. The micromechanical photothermal spectroscopy system as recited in claim 1, wherein the at least one cantilever thermal sensor has a surface, the surface being adapted for adsorbing the analyte thereon.

13. A micromechanical photothermal spectroscopy method adapted to use solar radiation, comprising the steps of:
   providing a micromechanical photothermal spectroscopy system, the micromechanical photothermal spectroscopy system including:
   i) a microcantilever thermal sensor assembly having at least one cantilever thermal sensor and a support, the at least one cantilever thermal sensor extending from the support, the at least one cantilever thermal sensor being made from a first material and a second material, the first and second materials having different coefficients of thermal expansion so that the at least one cantilever thermal sensor deflects when heat is applied to the sensor incident to absorption of infrared light by an analyte adsorbed on or disposed in the sensor, wherein the at least one cantilever thermal sensor defines a microfluidic channel configured for receiving the analyte in a fluid state, the channel having at least one wall transparent to infrared light;

ii) an optical grating and at least one optical filter configured for directly separating a beam of infrared light solely from solar radiation and at least one lens configured for projecting the beam of infrared light at least partially onto the microfluidic channel of the at least one cantilever thermal sensor; and iii) a deflection detector for measuring deflection of the at least one cantilever thermal sensor;

separating a beam of infrared light from solar radiation;

projecting the beam of infrared light at least partially onto a microcantilever thermal sensor array having an analyte disposed on or in at least one cantilever thermal sensor of the assembly;

measuring deflection of the at least one cantilever thermal sensor; and tuning the projected beam of infrared light over at least a portion of the infrared spectrum a plotting the measured deflection as a function of wavelength of the projected beam of infrared light to obtain a spectrum characteristic of the analyte.

14. The micromechanical photothermal spectroscopy method as recited in claim 13, further comprising the step of focusing the solar radiation into a focused beam.

15. The micromechanical photothermal spectroscopy method as recited in claim 14, further comprising the step of collimating the focused beam into a collimated beam.

16. The micromechanical photothermal spectroscopy method as recited in claim 15, further comprising the steps of receiving the collimated beam and separating the collimated beam into diffracted beams having differing wavelengths.

17. The micromechanical photothermal spectroscopy method as recited in claim 16, further comprising the step of separating out the beam of infrared light from the diffracted beams having differing wavelengths.

18. The micromechanical photothermal spectroscopy method as recited in claim 13, further comprising the step of measuring resistance of piezo-resistive material embedded in the at least one cantilever thermal sensor, the resistance of the piezo-resistive material being proportional to deflection of the at least one cantilever thermal sensor when the at least one cantilever thermal sensor is irradiated by a spectrum of infrared light.

* * * * *